United States Patent
Sum et al.

(10) Patent No.: US 9,750,294 B2
(45) Date of Patent: Sep. 5, 2017

(54) DECORATION DEVICE WITH PROJECTION IMAGES FOR HOLIDAYS, FESTIVALS AND PARTIES

(71) Applicant: Kan Wah Kan Sum, Hong Kong (HK)

(72) Inventors: Kan Wah Kan Sum, Hong Kong (HK); Chun Yuen Lau, Hong Kong (HK)

(73) Assignee: Kan Wah Kan Sum, Hong Kong (HK)

( * ) Notice: Subject to any disclaimer, the term of this patent is extended or adjusted under 35 U.S.C. 154(b) by 193 days.

(21) Appl. No.: 14/745,500

(22) Filed: Jun. 22, 2015

(65) Prior Publication Data

US 2016/0097969 A1    Apr. 7, 2016

Related U.S. Application Data

(60) Provisional application No. 62/060,559, filed on Oct. 6, 2014.

(51) Int. Cl.
| | |
|---|---|
| G03B 21/14 | (2006.01) |
| A41G 1/00 | (2006.01) |
| G03B 31/00 | (2006.01) |
| G03B 21/00 | (2006.01) |

(52) U.S. Cl.
CPC ............ *A41G 1/003* (2013.01); *A41G 1/005* (2013.01); *G03B 21/14* (2013.01); *G03B 31/00* (2013.01); *G03B 21/001* (2013.01)

(58) Field of Classification Search
CPC ......... G03B 21/14; G03B 31/00; F21V 33/00; F21V 33/0052; G09B 5/067
USPC .................. 353/15, 18, 19, 119; 362/101
See application file for complete search history.

(56) References Cited

U.S. PATENT DOCUMENTS

| | | | |
|---|---|---|---|
| 3,603,013 A | 9/1971 | Reed et al. | |
| 6,439,723 B1 * | 8/2002 | Tano | G03B 21/00 353/15 |
| 6,769,778 B1 * | 8/2004 | Lloyd | G09B 27/06 353/103 |
| 7,104,656 B2 * | 9/2006 | Dwyer | H04N 9/3141 348/E5.143 |
| 7,303,282 B2 * | 12/2007 | Dwyer | H04N 9/3141 348/E5.13 |
| 7,473,002 B1 | 1/2009 | Chen | |
| 8,879,782 B2 * | 11/2014 | Garlington | G03B 21/10 353/46 |
| 2002/0152656 A1 | 10/2002 | Huang | |
| 2003/0031009 A1 | 2/2003 | Fan | |
| 2005/0036317 A1 | 2/2005 | Niskanen | |

(Continued)

OTHER PUBLICATIONS

Combined Search and Examination Report of counterpart British Patent Application No. 1510864.0 dated Jul. 17, 2015.

(Continued)

*Primary Examiner* — William C Dowling

(57) ABSTRACT

A decoration device with projection images for holidays, festivals and parties includes a shell, a module provided inside the shell, a projection unit mounted on the module, a projection film provided on the projection unit, and an LED light source disposed at one side of the projection film so that a transparent image formed on the projection film can be projected on a surface of the shell by the light source. A Bluetooth® speaker can be mounted inside the module to play music and sound from a mobile device.

18 Claims, 14 Drawing Sheets

(56) References Cited

U.S. PATENT DOCUMENTS

| | | | |
|---|---|---|---|
| 2008/0174737 A1* | 7/2008 | Zebersky | G03B 21/145 353/28 |
| 2012/0268668 A1* | 10/2012 | Chien | F21S 4/28 349/5 |
| 2013/0016501 A1 | 1/2013 | Zinox | |
| 2014/0268663 A1 | 9/2014 | Yang | |
| 2014/0268673 A1 | 9/2014 | Yang | |
| 2014/0268861 A1 | 9/2014 | Yang | |

OTHER PUBLICATIONS

Search Report issued by the Chinese Patent Office dated Dec. 31, 2014.

* cited by examiner

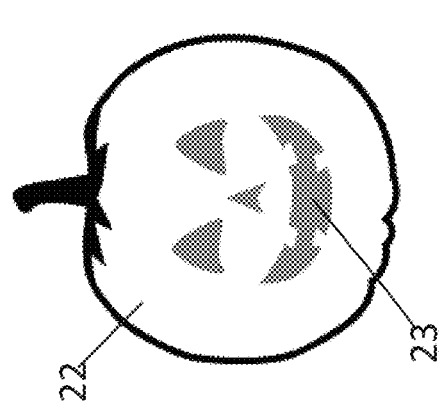
FIG. 1
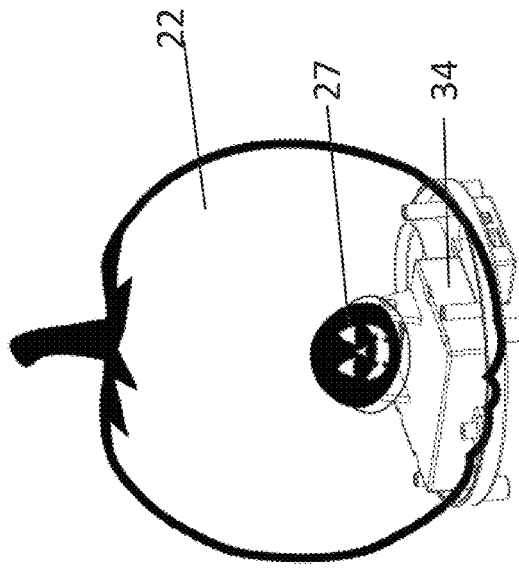
FIG. 2
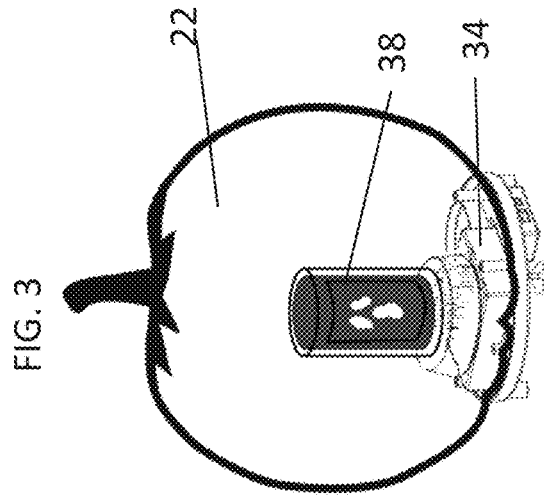
FIG. 3
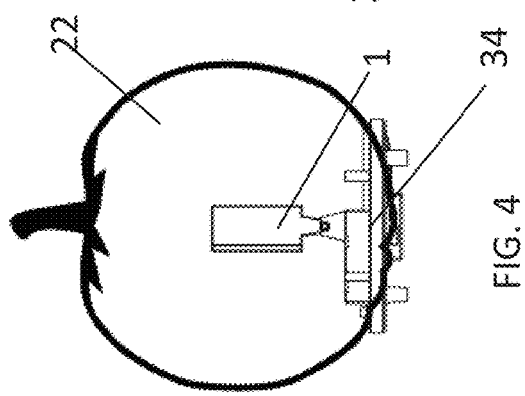
FIG. 4
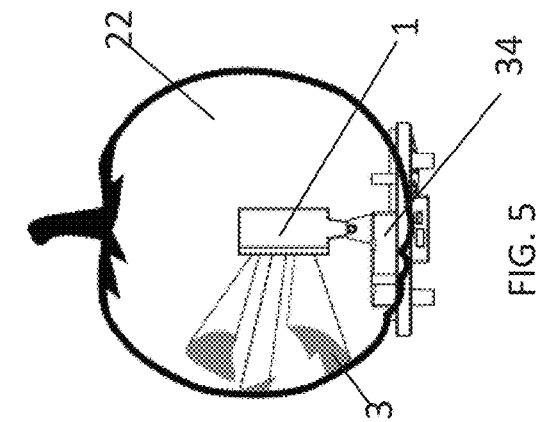
FIG. 5
FIG. 6

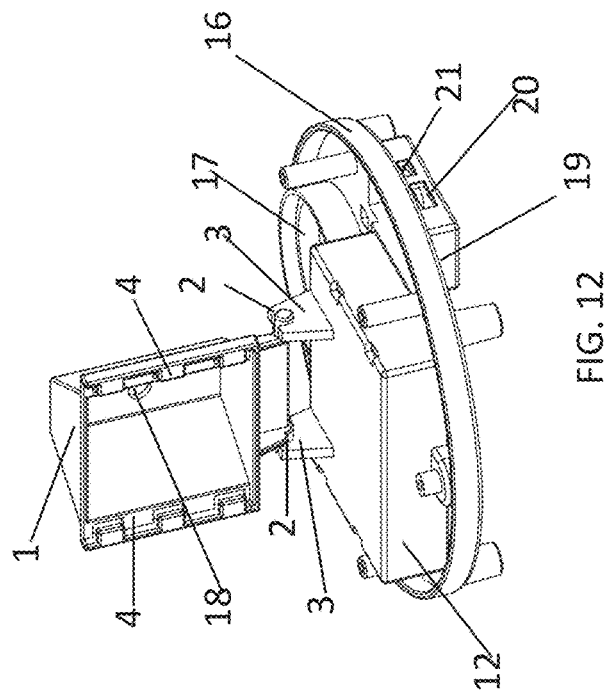
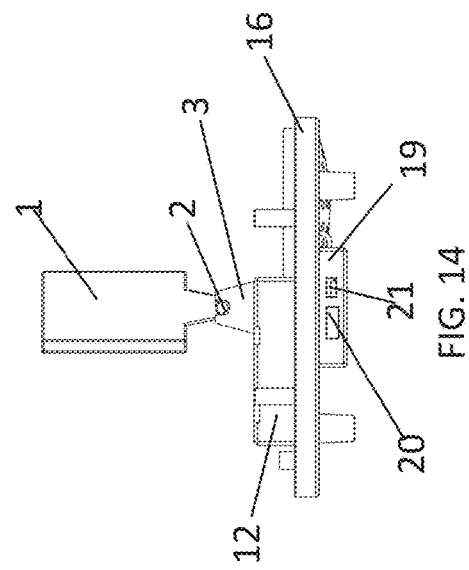
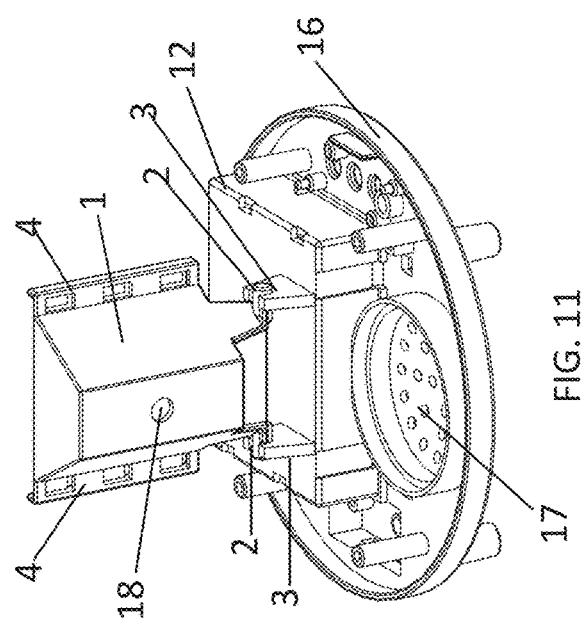
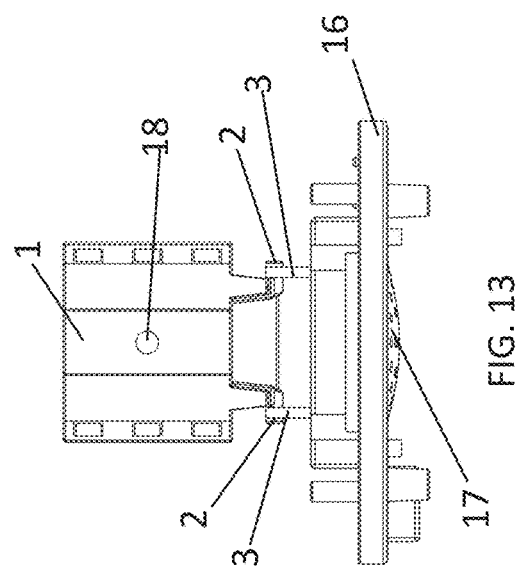

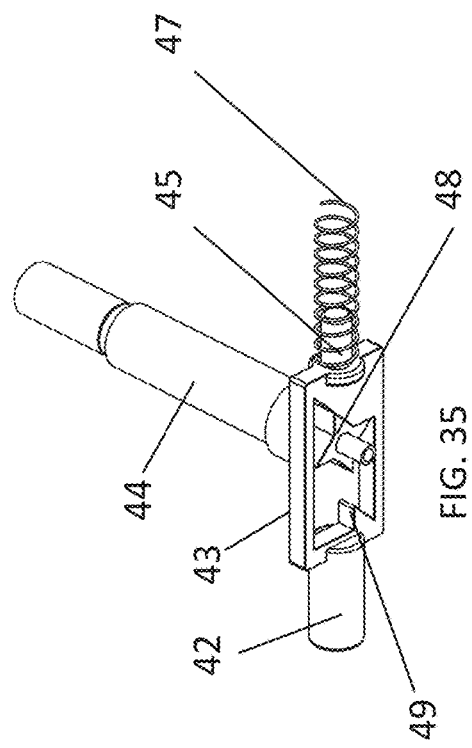
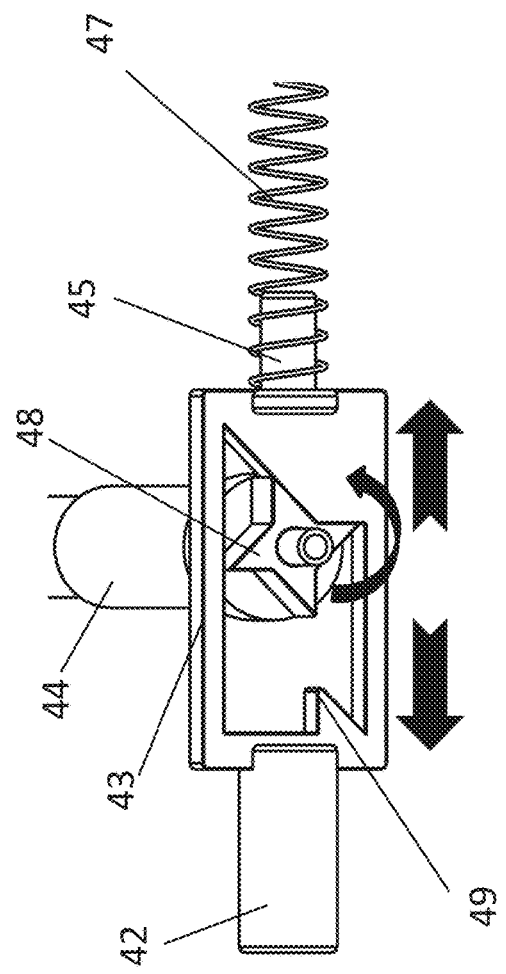
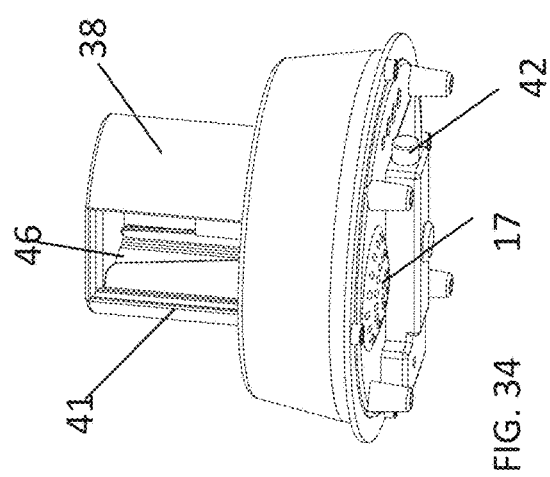
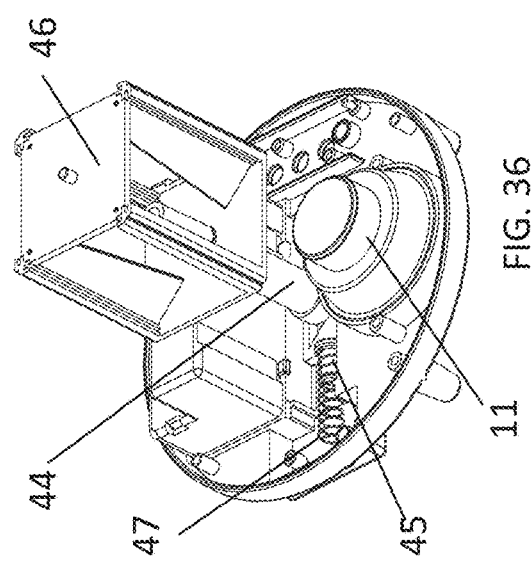

DECORATION DEVICE WITH PROJECTION IMAGES FOR HOLIDAYS, FESTIVALS AND PARTIES

CROSS-REFERENCE TO RELATED APPLICATIONS

This application claims the benefit of U.S. Provisional Patent Application No. 62/060,559 filed Oct. 6, 2014, the entire content of which is hereby incorporated by reference.

FIELD OF THE TECHNOLOGY

The present patent application generally relates to a decoration device, and particularly to a decoration device with projection images for holidays, festivals and parties.

BACKGROUND

There are illuminated novelties for parties, holidays and festivals such as Halloween, Christmas, and Easter For example, there are illuminated novelties such as Halloween Jack-'O-Lanterns that may be made and used as decoration. Traditionally, a lot of people like to decorate their porches or their houses with pumpkin decorations for Halloween. Pumpkin carving is a popular event for kids, by removing the soft pulp of a pumpkin, carving side openings representing eyes, nose and mouth of the pumpkin and placing a candle inside the hollow pumpkin to light up the carved openings and the pumpkin head, which is commonly called Jack-'O-Lantern. However, real pumpkin decorations are perishable and can't be displayed for a long time. Therefore, artificial Jack-'O-Lanterns have been developed which are made of different materials, such as ceramic, Polyresin, PU foam, Paper Mache, Styrofoam or plastic materials. Some of these artificial pumpkins are known to have electric lights or battery-operated light bulbs to replace candles as a light source inside the pumpkin.

Both real pumpkin and artificial pumpkins are limited to one carved face or one molded face only. Since the face is either carved or molded on the pumpkin, so the face cannot be changed unless you buy a new one or carve another real pumpkin.

Some of the decoration pumpkins may come with sound and light, but the sound is pre-recorded in IC chip which is usually very short and the sound quality is not very good, and people do not have a choice on the music or sound playback from the pumpkin decoration.

There is a desire to produce a decoration device which can project various images on the surface of the device or even on a wall for holidays, festivals and parties.

The above description of the background is provided to aid in understanding the decoration device with projection images, but is not admitted to describe or constitute pertinent prior art to the decoration device with projection images, or consider the cited documents as material to the patentability of the claims of the present application.

SUMMARY

According to one aspect, there is provided a decoration device with projection images for holidays, festivals and parties. The device may include a shell, a module provided inside the shell, a projection unit mounted on the module, a projection film provided on the projection unit, an LED light source disposed at one side of the projection film so that an image formed on the projection film can be projected on a surface of the shell by the light source when turned on by a power source, and a Bluetooth® speaker mounted inside the module. The Bluetooth® technology can be used for communication between the speaker and a mobile device so that the speaker can play music and sound from the mobile device. A separate projection unit may be mounted on an outer surface of the shell for projecting a separate image on a wall. The separate projection unit may include a separate LED light source and a separate projection film formed with the separate image.

According to another aspect, there is provided a decoration device with projection images for holidays, festivals and parties. The device may include a shell, a module provided inside the shell, a projection unit mounted on the module, a projection film provided on the projection unit, and a light source disposed at one side the projection film so that an image on the projection film can be projected on a surface of the shell by the light source when turned on by a power source. The projection unit may be dome-shaped or cylindrical in shape.

In one embodiment, a 4-sided film holder may be provided inside the cylindrical projection unit for holding thereon four projection films with four images respectively. A rectangular opening can be formed on the cylindrical projection unit to allow projection of the image on one of the four projection films. The projection film may be cylindrical in shape.

The cylindrical projection film can be supported on a first shaft coupled with a first gear which is meshed with a second gear. The second gear can be coupled with a second shaft rotatable by a switch formed at one end thereof, whereby the cylindrical projection film is rotatable by turning the switch.

The image on the projection film may be transparent image, non-transparent image, cut-out hole, silhouette or in other possible form.

In one embodiment, the projection unit can be hingedly connected with the module by a hinge mechanism so that projection angle can be adjusted. In one embodiment, the hinge mechanism may include two hinge rods formed on the projection unit and frictionally engaged within two c-shaped openings formed on two hinge rod-holding stands provided on the module respectively.

The device may further include a speaker mounted inside the module. The speaker may be a Bluetooth® speaker and Bluetooth® technology can be used for communication between the speaker and a mobile device so that the speaker can play music and sound from the mobile device.

The device may further include an integrated circuit chip connected with the speaker to playback pre-recorded music and sound stored in the chip. The device may further include a battery compartment provided in the module for holding therein a battery for supplying electric power.

The device may further include a micro USB port provided on the module for connection with a charger for charging a rechargeable battery provided in the module. In one embodiment, the light source may be an LED light source.

The device may further include a separate projection unit mounted on an outer surface of the shell for projecting a separate image on a surface facing the separate projection unit. The separate projection unit may include a separate light source and a separate projection film formed with the separate image. In one embodiment, the separate projection unit may be dome-shaped.

The four-sided film holder may include a central shaft with a 4-tooth gear mounted on a lower end thereof, and a shaft connector provided with a pointy tooth engageable with the 4-tooth gear so that when a button provided on the shaft connector is pressed in a direction towards a biasing spring mounted on a rod connected to one side of the shaft connector opposite to the button, the pointy tooth engages with the 4-tooth gear and rotates the 4-tooth gear as well as the four-sided film holder forty-five degrees. When the button is released the shaft connector returns to its original position under the biasing force of the spring.

To overcome the deficiencies of the existing decoration devices, the present patent application provides a changeable projection device, which allows people to change the face design of the shell by changing the projection film on the projection module inside the shell. This projection device also helps to create the element of surprise because the projection faces or illusion images are hidden when the item is inactivated. For example, a pumpkin device can just look like an ordinary pumpkin, but the hidden images or graphic will definitely surprise the guest with its projected image on the plain pumpkin surface and actually the illusion is coming from inside, this is just like magic!

To overcome the deficiencies of the existing decoration devices with only limited playback of sound or music and the problem of poor sound quality, the present patent application provides a great solution as Bluetooth® speaker can be added to the device, so people can stream their favorite music or sound effects from their mobile device wirelessly via the Bluetooth® technology and it has much better sound quality than the normal pumpkin decorations with pre-recorded sound chip.

Although the decoration device with projection images is shown and described with respect to certain embodiments, it is obvious that equivalents and modifications will occur to others skilled in the art upon the reading and understanding of the specification. The decoration device with projection images in the present application includes all such equivalents and modifications, and is limited only by the scope of the claims.

BRIEF DESCRIPTION OF THE DRAWINGS

Specific embodiments of the decoration device with projection images will now be described by way of example with reference to the accompanying drawings wherein:

FIG. 1 is a pumpkin-shaped device with a projection image on it according to an embodiment of the present application.

FIG. 2 is the pumpkin without any projection image on it.

FIG. 3 is the perspective view of the projection module inside the pumpkin shell, and the projection module has a dome-shaped projection unit on it according to an embodiment of the present application.

FIG. 4 is the perspective view of the pumpkin-shaped device with changeable projection unit in it according to the first embodiment of the present application.

FIG. 5 is the perspective view of the pumpkin-shaped device with changeable projection unit in it, illustrating the projection image is projected from the projection unit onto the pumpkin shell from its interior according to the first embodiment of the present application.

FIG. 6 is the perspective view of the pumpkin-shaped device with cylinder-shaped projection unit in the pumpkin shell.

FIG. 11 is the perspective view of the module according to an embodiment of the present application.

FIG. 12 is another perspective view of the module according to an embodiment of the present application.

FIG. 13 is the back view of the module according to an embodiment of the present application.

FIG. 14 is the side view of the module according to an embodiment of the present application.

FIG. 34 is the perspective view of the cylinder-shaped projection unit with rotatable projection film holder according to the fourth embodiment of the present application.

FIG. 35 is the drawing of the button and the shaft according to an embodiment of the present application.

FIG. 35*a* is an enlarged drawing of the button and the shaft according to an embodiment of the present application.

FIG. 36 is another perspective view of the cylinder-shaped projection unit with rotatable projection film holder according to the fourth embodiment of the present application.

THE EXPLANATION OF REFERENCE NUMERALS

Figure 7:
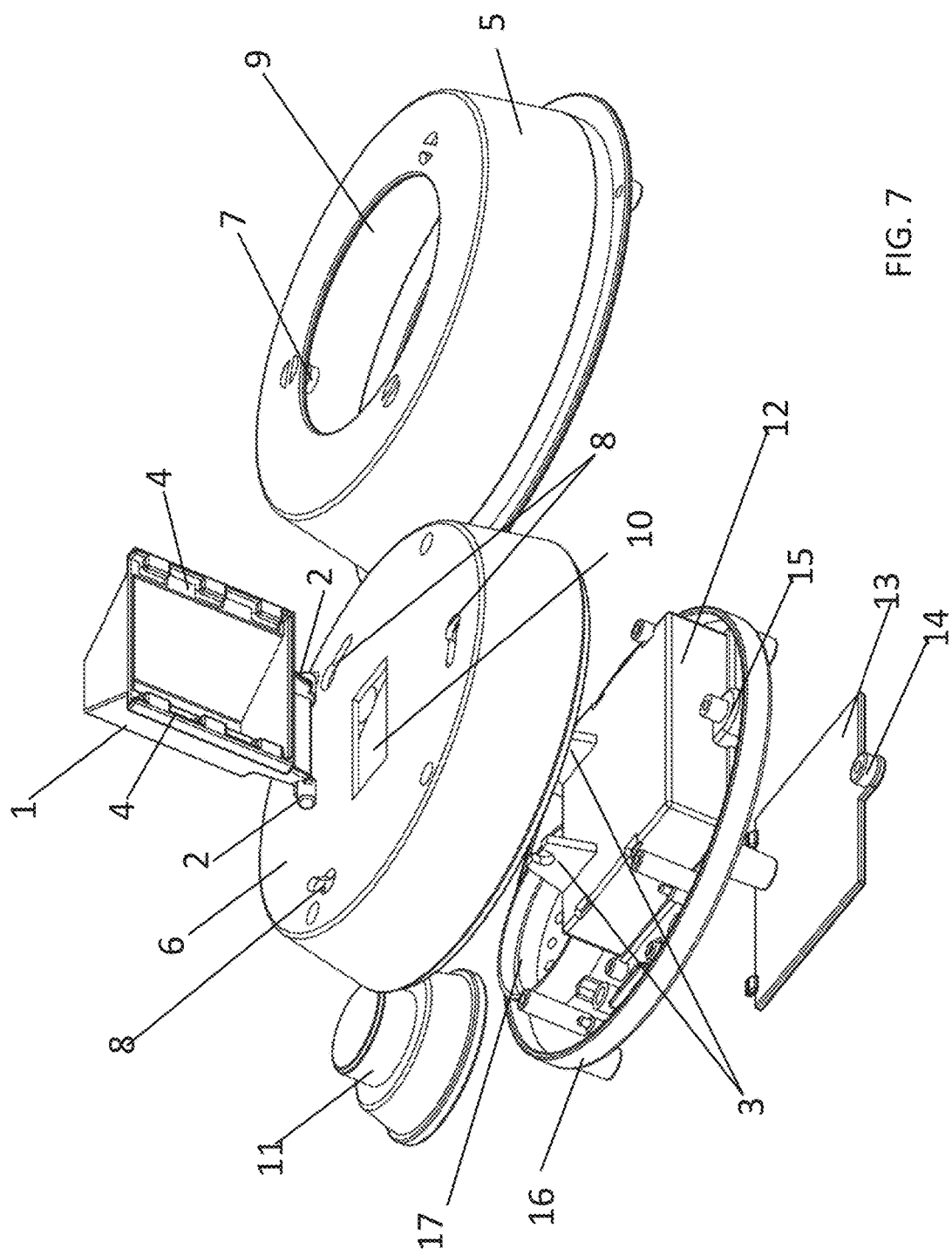
FIG. 7 is a comprehensive drawing of the module inside the pumpkin-shaped device with changeable projection images with the pumpkin shell being removed according to the first embodiment of the present application.

1 Projection Unit
2 Hinge Rods
3 Hinge Holder Stands
4 Film Holders
5 Outer Housing
6 Inner Housing
7 Locking Knob
8 Locking Hole
9 Hole A
10 Hole B
11 Speaker
12 Battery Compartment
13 Battery Compartment Door
14 Screw Hole on Battery Compartment Door
15 Screw Hole on Battery Compartment
16 Module Base
17 Speaker Cavity
18 LED hole
19 Power Switch Terminal
20 Power Switch
21 Micro USB
22 Pumpkin Shell
23 Projected Image (on Pumpkin)
24 LED
25 Projected illusion on the Wall
26 Rectangle Projection Film
27 Dome Shaped Projection Unit
28 Base of the Dome Shaped Projection Unit
29 Transparent Image on the Dome Shaped Projection Unit
30 Face A
31 Face B
32 Face C
33 Face D
34 module
35 Gear A
36 Gear B
37 Shaft A
38 Cylinder Shaped Projection Unit
39 Projection film
40 Switch
41 opening
42 Button
43 Shaft connector
44 Shaft B
45 Joint
46 four-side Film Holder
47 Spring
48 Star gear
49 Pointy Section
50 separate projection unit

DETAILED DESCRIPTION

Reference will now be made in detail to a preferred embodiment of the decoration device with projection images, examples of which are also provided in the following description. Exemplary embodiments of the decoration device with projection images are described in detail, although it will be apparent to those skilled in the relevant art that some features that are not particularly important to an understanding of the decoration device with projection images may not be shown for the sake of clarity.

Furthermore, it should be understood that the decoration device with projection images is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure and appended claims.

In addition, improvements and modifications which may become apparent to persons of ordinary skill in the art after reading this disclosure, the drawings, and the appended claims are deemed within the spirit and scope of the protection.

For illustration purposes, the terms "upper", "lower", "right", "left", "vertical", "horizontal", "top", "bottom" appeared hereinafter relate to the invention as it is oriented in the drawings. It is understood that the invention may assume various positions, except where expressly specified to the contrary. Furthermore, it is understood that the specific devices shown in the drawings, and described in the following description, are simply exemplary embodiments of the invention. Hence, specific dimensions and other physical characteristics related to the embodiments disclosed hereinafter are not to be considered as limiting.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element or is in mechanical or electrical communication with another element.

In accordance with an embodiment of the present patent application, FIGS. 1-6 provide different views of the illuminated pumpkin decoration with different configurations of the projection device. As shown in these figures, the illuminated pumpkin may include the following parts: a pumpkin shaped shell 22, a module 34 and a projection unit 1, or a dome-shaped projection unit 27, or a rotatable cylinder-shaped projection unit 38. It is understood that the projection unit may in any other shape.

The pumpkin shell 22 may be made of plastic, vinyl or other rigid materials. The pumpkin shell 22 should be shaped like a real pumpkin. There is an opening at the bottom of the pumpkin shell 22 for installation of the module 34.

The pumpkin shell 22 may also include recessed depressions or cut out holes representing the face of a Jack-'O-

Lantern pumpkin. If recessed depressions are applied on the pumpkin shell 22, fabric or paint may be attached or painted on the recessed area to represent eyes, nose and mouth of a Jack-'O-Lantern. The painted or fabric covered area will cover the light when lights inside the pumpkin shell 22 are on and then generate a silhouette or an image of a Jack-O-Lantern face. When cut out holes are applied to the pumpkin shell, the cut out area allows light to shine through the holes. When lights inside the pumpkin shell 22 are on, then it generates an illuminated Jack-'O-Lantern face as the interior light source is shining through the holes.

Both recessed depressions and cut out holes create a permanent face on the pumpkin shell 22, but that face cannot be hidden, removed or changed.

The present patent application provides several embodiments of a pumpkin shell 22 with hidden face or image inside. The pumpkin shell 22 can be made to look just like an ordinary pumpkin decoration. No one would know what's inside until the lights inside the pumpkin shell 22 are turned on. LED fixed on the projection unit 1 may work as a light source to project a projected image 23 onto the pumpkin shell 22 from its interior. The image on projection film can be projected onto the pumpkin shell 22 and can generate an illuminated face or an illuminated image, which can be visible from outside the pumpkin shell 22. FIG. 1 shows the projected image 23 on the pumpkin shell 22 and FIG. 2 shows the pumpkin shell 22 without any projected image.

In addition to the pumpkin shell 22, the present patent application also includes a module 34 which may be attached to the opening at the bottom of the pumpkin shell 22, as shown in FIGS. 3-6 and FIG. 28. The module 34 includes two main sections, namely a projection section and a power controller section.

The projection section can be configured in five different options/embodiments:

Embodiment 1

The projection section can be configured as a projection unit 1 to hold a rectangle projection film 26 (see FIGS. 4-5).

Figure 8:
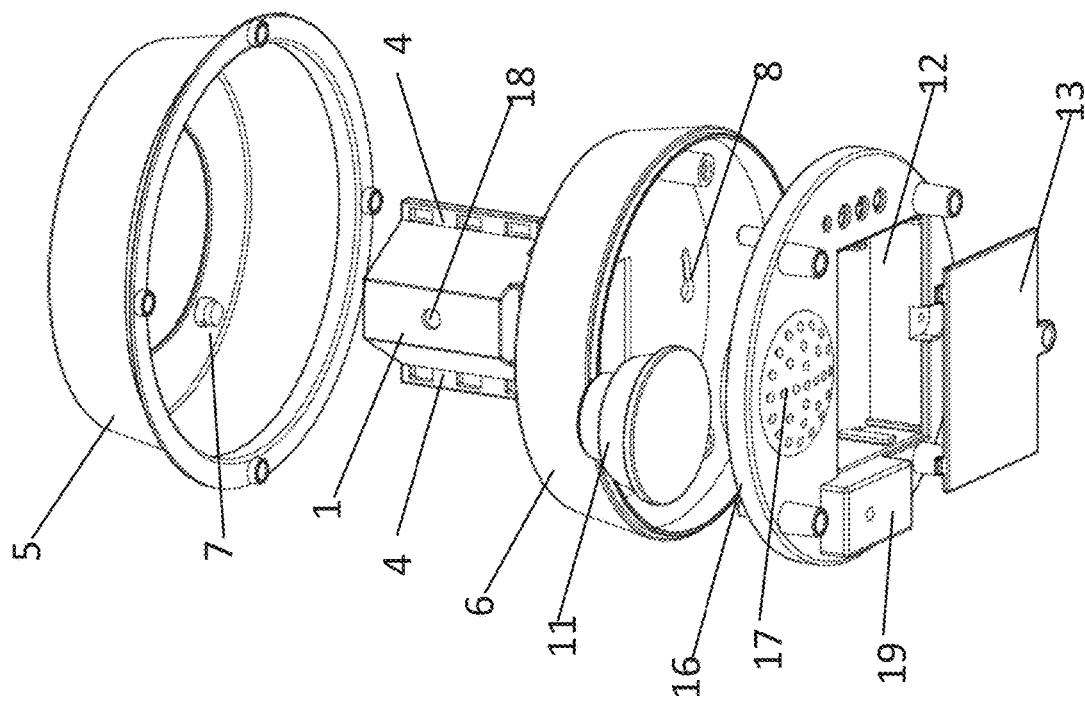
FIG. 8 is another comprehensive drawing of the module inside the pumpkin-shaped device with changeable projection images according to an embodiment of the present application.
Figure 10:
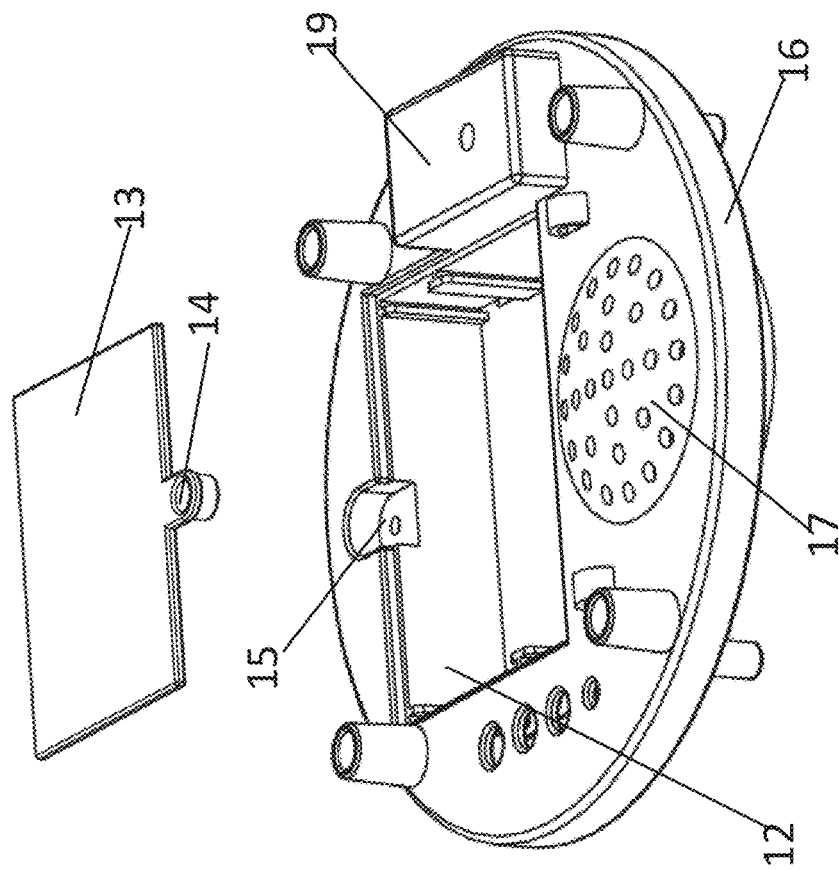
FIG. 10 is the perspective view of the base of the module according to an embodiment of the present application.
Figure 9:
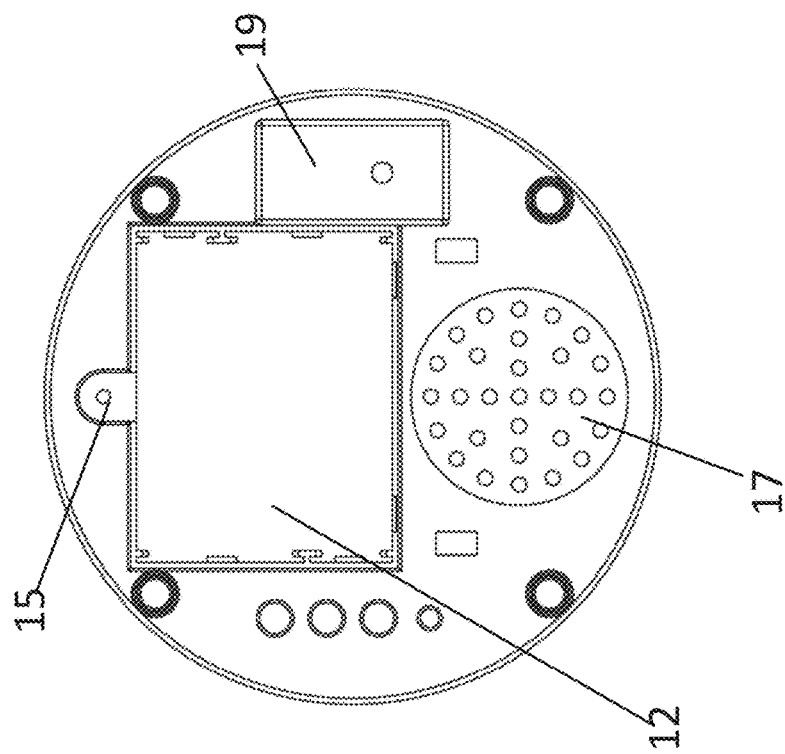
FIG. 9 is the bottom view of the module according to an embodiment of the present application.
Figure 16:
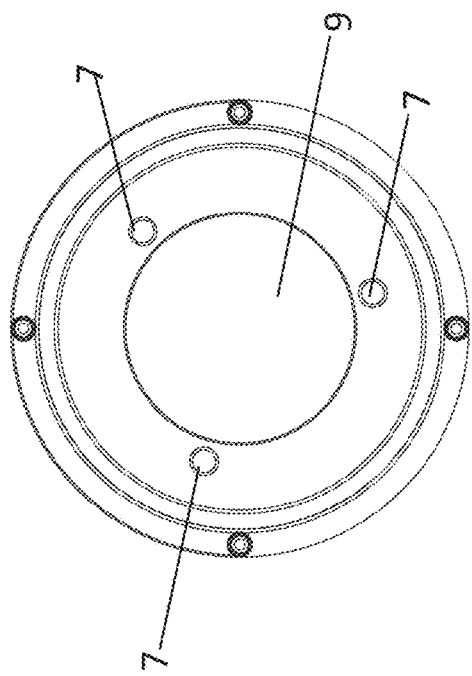
FIG. 16 is the bottom view of the outer housing according to an embodiment of the present application.
Figure 18:
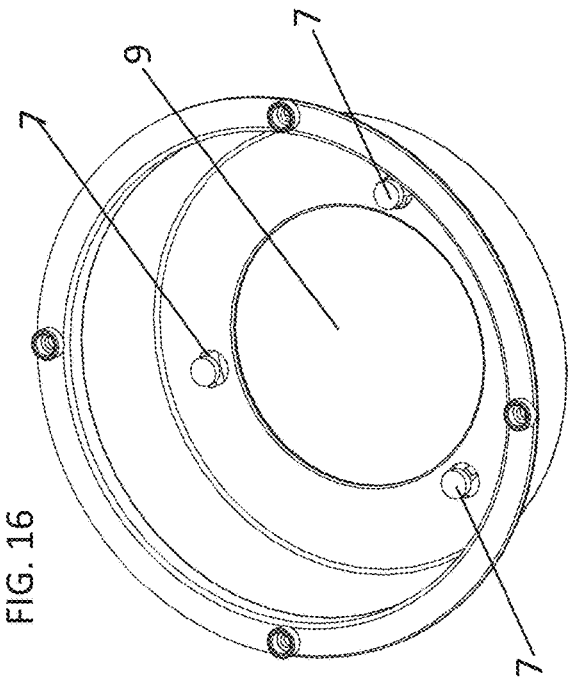
FIG. 18 is the perspective view of the outer housing.
Figure 15:
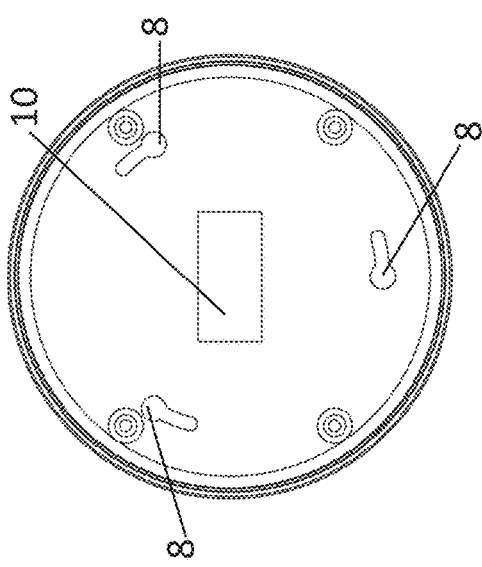
FIG. 15 is the bottom view of the inner housing according to an embodiment of the present application.
Figure 17:
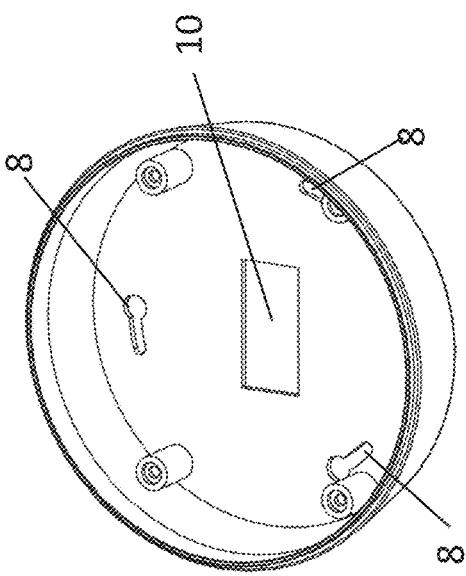
FIG. 17 is a perspective view of the inner housing.
Figure 20:
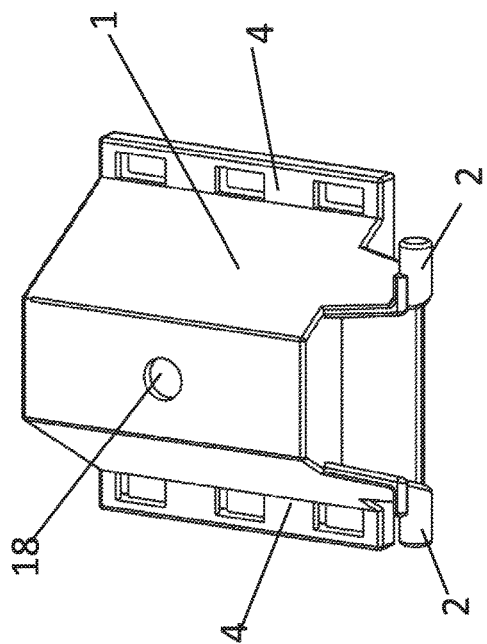
FIG. 20 is the perspective view of the projection unit according to the first embodiment of the present application.
Figure 22:
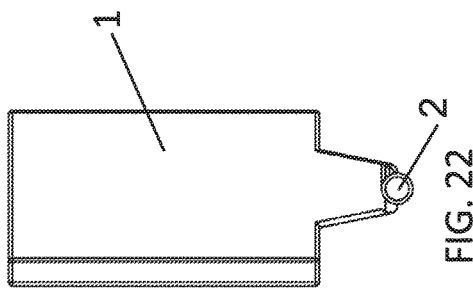
FIG. 22 is the side view of the projection unit according to the first embodiment of the present application.
Figure 19:
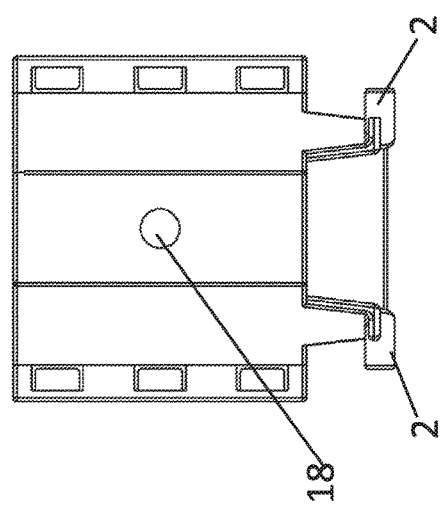
FIG. 19 is the back view of the projection unit according to the first embodiment of the present application.
Figure 21:
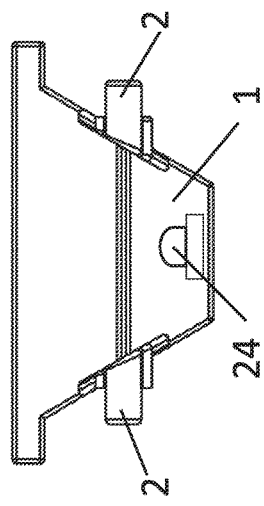
FIG. 21 is the bottom view of the projection unit according to the first embodiment of the present application.

In this case, module 34 can be configured to hold the rectangle projection film 26. Referring to FIG. 7, the module may include the following parts: an outer housing 5, a projection unit 1, an inner housing 6, a module base 16, a battery compartment 12 and a speaker 11 (for the function of playback music or sound). FIG. 7 is a comprehensive drawing of module 34 which may be configured to hold the rectangle projection film 26. FIG. 8 is the general assembly drawing of the construction of the module 34.

FIG. 8 also shows how this module 34 can be assembled and the general concept of making the projection film replaceable without using any tools.

Outer housing 5 may be a fixture to be attached to the bottom of the pumpkin shell 22 by using screws or any kind of adhesive glue. As shown in FIGS. 7-8 and FIGS. 11-14, the projection unit 1, inner housing 6, module base 16, battery compartment 12, battery compartment door 13 and speaker 11 can be attached together by screws or any other locking means. As shown in FIGS. 11-14, the projection unit 1 can be connected to the module 34 by frictionally engaging two hinge rods 2 in two c-shaped openings formed on two hinge rod-holding stands 3 on the module 34 respectively.

The inner housing 6 can be attached to the power controller section to hold both hinge rods 2 securely onto the hinge rod-holding stands 3 and then form a hinged construction which can allow a user to adjust the projection angle. As a result, the user can adjust the projected image to the desired location on the pumpkin shell 22 by tilting the projection unit 1. Tilting the projection unit 1 up can move projected image 23 to a higher position on the pumpkin shell 22, and tilting the projection unit 1 down can move the projected image 23 to a lower position on the pumpkin shell 22. It is understood by one skilled in the art that the hinge construction can be in the form of any other possible hinge mechanism.

Figure 27:
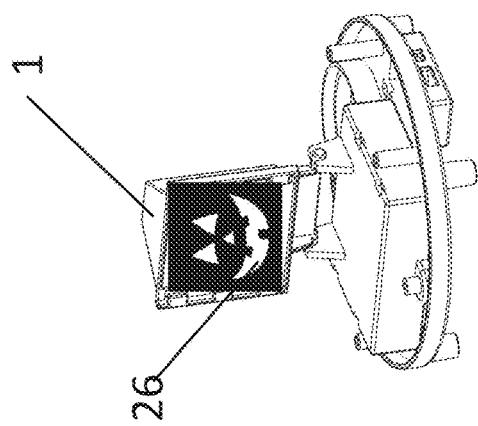
FIG. 27 is the perspective view of the projection module with projection film installed onto the projection unit according to the first embodiment of the present application.
Figure 24:
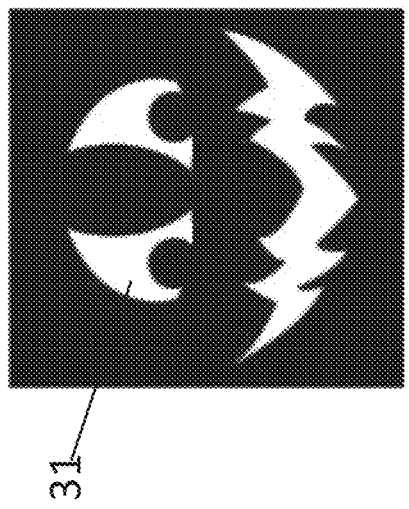
FIG. 24 is an example of the projection film design, called face B.
Figure 26:
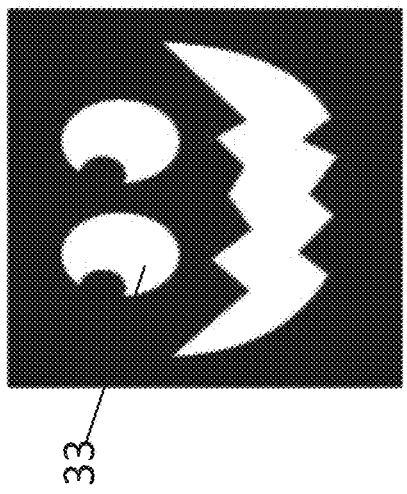
FIG. 26 is an example of the projection film design, called face D.
Figure 23:
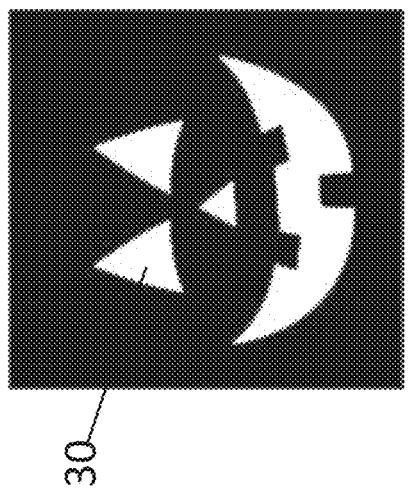
FIG. 23 is an example of the projection film design, called face A.
Figure 25:
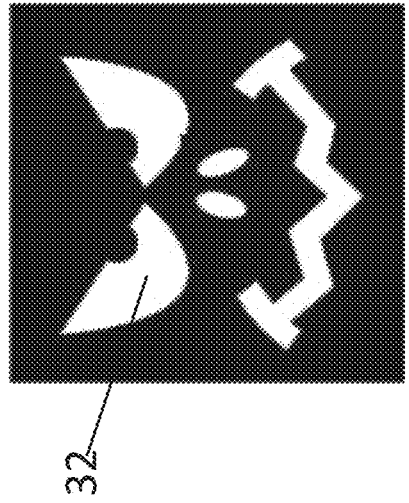
FIG. 25 is an example of the projection film design, called face C.

Projection unit 1 can be used to hold the rectangle projection film 26. FIGS. 23-26 are examples of different rectangle projection films 26 with different transparent images 30, 31, 32, 33, which can be placed at the front side of the projection unit 1 (as shown in FIG. 27). It is possible that the image 30, 31, 32, 33 is not transparent, whereas the area around the image 30, 31, 32, 33 is transparent. It is also possible that the image 30, 31, 32, 33 is transparent, whereas the area around the image 30, 31, 32, 33 is not transparent. It is also possible that the image 30, 31, 32, 33 can be a cut-out hole or silhouette where light can shine through the hole or the silhouette to project the desire image on the pumpkin shell 22 from its interior. Film holders 4 can be formed on the front edges of the opening of projection unit 1 to hold the rectangle projection film 26. Users can replace the projection film by pulling out the old one and sliding in a new one. After the film is securely fastened on the projection unit 1. The users can put the whole module 34 back in the pumpkin shell 22 by a simple process. The users can insert the module 34 through the opening on the bottom of the pumpkin shell 22. The projection unit 1 should be able to go through a hole 9 on the outer housing 5 which can be fixed on the pumpkin shell 22 permanently. The user can insert all three locking knobs 7 (molded on the outer housing 5) into three corresponding key-shaped locking holes 8 on the inner housing 6, and turn the whole module 34 clockwise to lock it into place. Turning the whole module 34 anti-clockwise can unlock the module 34 from the pumpkin shell 22. It is understood by one skilled in the art that the module 34 can be attached to the bottom of the pumpkin shell 22 in other possible ways without using the outer housing 5 and/or the inner housing 6. For example, the module base 16 of the module 34 may be provided with snap-fit elements that can be releasably snap-fitted onto corresponding snap-fit elements formed on the bottom opening of the pumpkin shell 22.

FIGS. 19-22 show different views of the projection unit 1. An LED hole 18 can be provided to hold an LED 24 which may serve as a projection light source inside the projection unit 1. Film holders 4 may be provided on the front edges of the opening of the projection unit 1. The film holders 4 can be used to hold rectangle projection film 26. Two hinge rods 2 may be provided on the bottom of the projection unit 1, which can be attached to the hinge rod holding stands and covered by the inner housing 6 to form a hinge construction which can allow user to adjust the projection angle.

As shown in FIGS. 7-10, a battery compartment 12 can be provided to hold three AA batteries which can be used as a power supply of the module 34. A speaker cavity 17 can be provided to hold a speaker 11. The device will be able to playback music or sound effect if speaker 11 is installed.

As shown in FIG. 12 and FIG. 14, the module 34 can also be configured to use Li-Polymer rechargeable battery. If Li-Polymer rechargeable battery is used, a micro USB port 21 can be provided for the purpose of charging the battery. Rechargeable battery can be recharged by connecting the module 34 to a USB charger or the USB port on a computer via a USB charging cable.

Both AA batteries in the battery compartment 12 and Li-Polymer rechargeable battery can provide power to light up the LED in the projection unit 1 to work as a light source in the projection unit 1. Once the light source is on, the projected image 23 will be projected on the pumpkin shell from its interior.

If Bluetooth® technology is used, speaker 11 can play music or sound once the device is successfully connected to any mobile device via the Bluetooth® technology.

If an integrated circuit (IC) is provided, the speaker 11 can playback pre-recorded music or sound stored in an IC chip.

Embodiment 2

Figure 30:
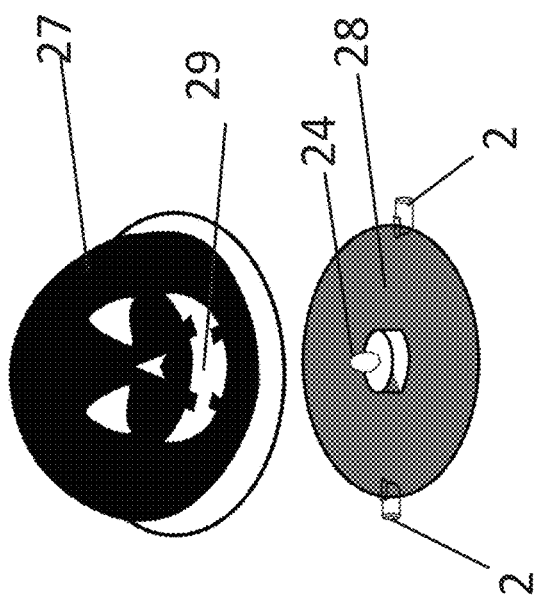
FIG. 30 is the drawing of the dome-shaped projection unit and the base of the dome-shaped projection unit according to the second embodiment of the present application.
Figure 29:
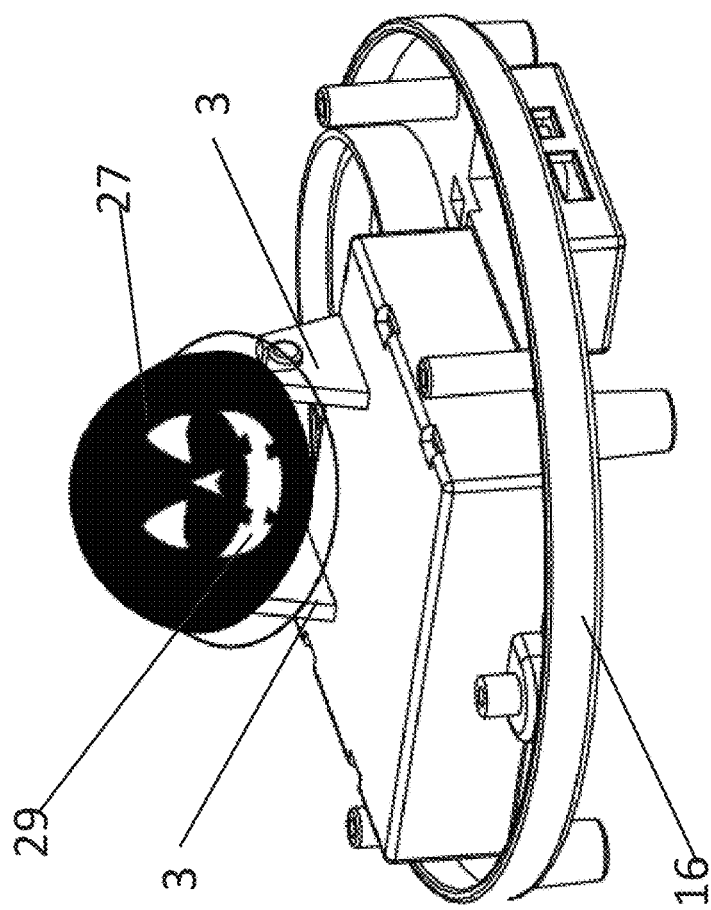
FIG. 29 is the perspective view of the dome-shaped projection unit according to the second embodiment of the present application.

The projection section can be configured as a dome-shaped projection unit 27 (See FIG. 3, FIG. 29 and FIG. 30).

In this configuration, module 34 can be configured to hold a dome-shaped projection unit 27. It may include the following parts: an outer housing 5, a dome-shaped projection unit 27, an inner housing 6, a module base 16, a battery compartment 12 and a speaker 11 (for the function of playback music or sound). FIG. 3 is a drawing of the module 34 which can be configured to hold the dome-shaped projection unit 27.

The present patent application also provides an embodiment to allow users to have the option of changing the projection image inside the pumpkin without using any tools.

A user can simply insert the module 34 in the pumpkin shell 22 through an opening on the bottom of the pumpkin shell 22. The dome-shaped projection unit 27 should be able to go through the hole 9 on the outer housing 5 which can be fixed on the pumpkin shell 22 permanently. The user can insert all three locking knobs 7 (molded on the outer housing 5) into three corresponding key-shaped locking holes 8 on the inner housing 6 and turn the whole module 34 clockwise to lock it into place. Turning the whole module 34 anti-clockwise can unlock the module 34 from the pumpkin shell 22. It is understood by one skilled in the art that the module 34 can be attached to the bottom of the pumpkin shell 22 in other possible ways without using the outer housing 5 and/or the inner housing 6. For example, the module base 16 of the module 34 may be provided with snap-fit elements that can be releasably snap-fitted onto corresponding snap-fit elements formed on the bottom opening of the pumpkin shell 22.

FIG. 30 shows an example of the dome-shaped projection unit 27 and a base of the dome-shaped projection unit 28. Two hinge rods 2 may be provided on the bottom of the base of dome-shaped projection unit 27. Two hinge rods 2 on the bottom of the base of dome-shaped projection unit 28 can be attached to the hinge rod holding stands 3 and form a hinge construction which can allow users to adjust the projection angle. A transparent image 29 can be provided on the dome-shaped projection unit 27. It is possible that the image 29 is not transparent, whereas the area around the image 29 is transparent. It is also possible that the image 29 is transparent, whereas the area around the image 29 is not transparent. It is also possible that the image 29 can be a cut-out hole or silhouette where light can shine through the hole or the silhouette to project the desire image on the pumpkin shell 22 from its interior. The transparent image 29 on the dome-shaped projection unit 27 can be changed by changing to another dome-shaped projection unit 27 with a different transparent image on the dome-shaped projection unit. Users can choose the one with a face design to project the face illusion on the pumpkin shell 22 or the one with various graphics all over the dome-shaped projection unit 27 to project graphics on to the whole pumpkin shell 22 from its interior.

As shown in FIGS. 7-10, a battery compartment 12 may be provided to hold three AA batteries which can serve as a power supply of the module 34. A speaker cavity 17 may be provided to hold a speaker 11. The device will be able to playback music or sound if the speaker 11 is installed.

As shown in FIG. 12 and FIG. 14, the module 34 can also be configured to use Li-Polymer rechargeable battery. If Li-Polymer rechargeable battery is used, there should be a micro USB port 21 provided for the purpose of charging the battery. Rechargeable battery can be recharged by connecting the module 34 to a USB charger or a USB port on a computer via a USB charging cable.

Both AA batteries in the battery compartment 12 and Li-Polymer rechargeable battery can provide power to light up LED 24 in the dome-shaped projection unit 27 to work as a light source in the projection unit. Once the light source is on, it will project the projected image 23 on the pumpkin shell from its interior.

If Bluetooth® technology is used, the speaker 11 can play the music or sound effect once the device is successfully connected to any mobile device via the Bluetooth® technology.

If an integrated circuit (IC) is used, the speaker 11 can playback pre-recorded music or sound stored in an IC chip.

Embodiment 3

Figure 33:
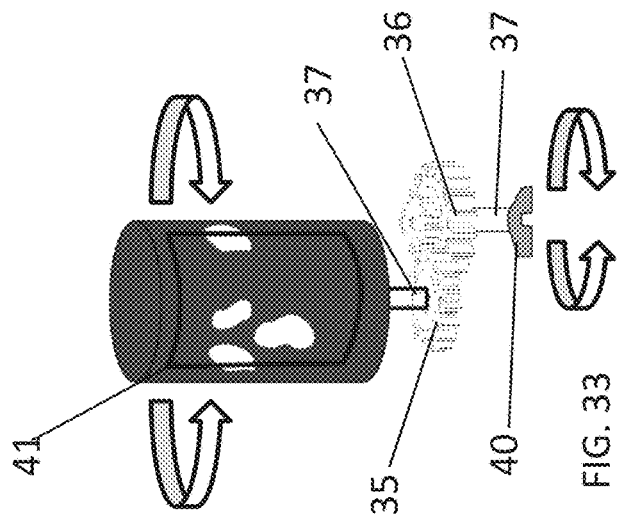
FIG. 33 shows the mechanical construction of the rotatable device on the cylinder-shaped projection unit according to the third embodiment of the present application.
Figure 31:
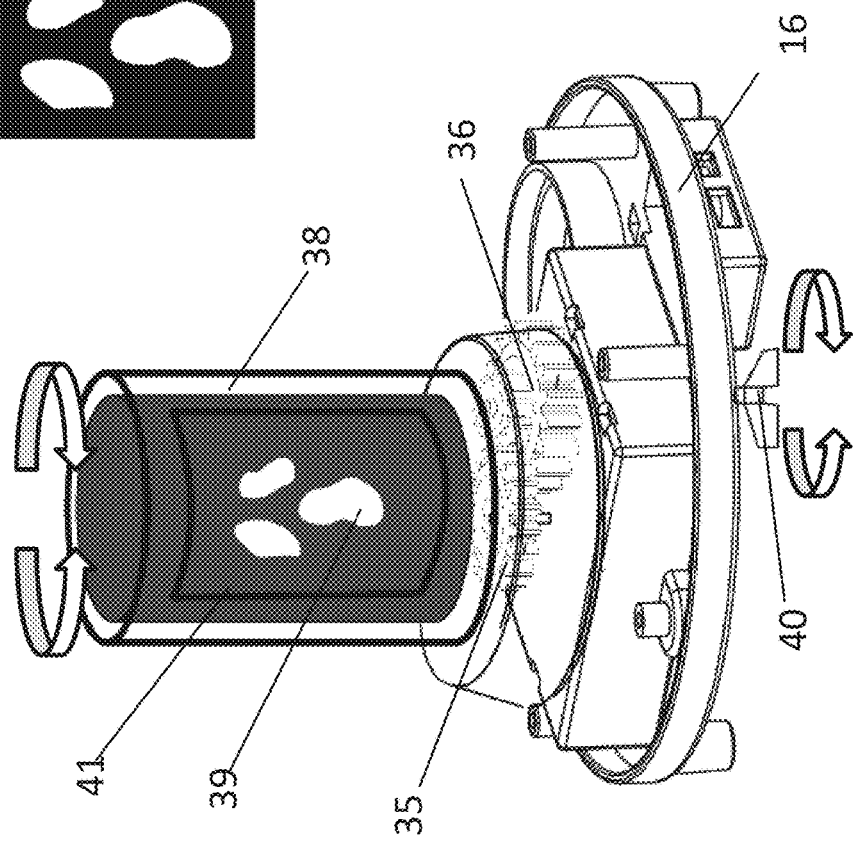
FIG. 31 is the perspective view of the cylinder-shaped projection unit according to the third embodiment of the present application.
Figure 38:
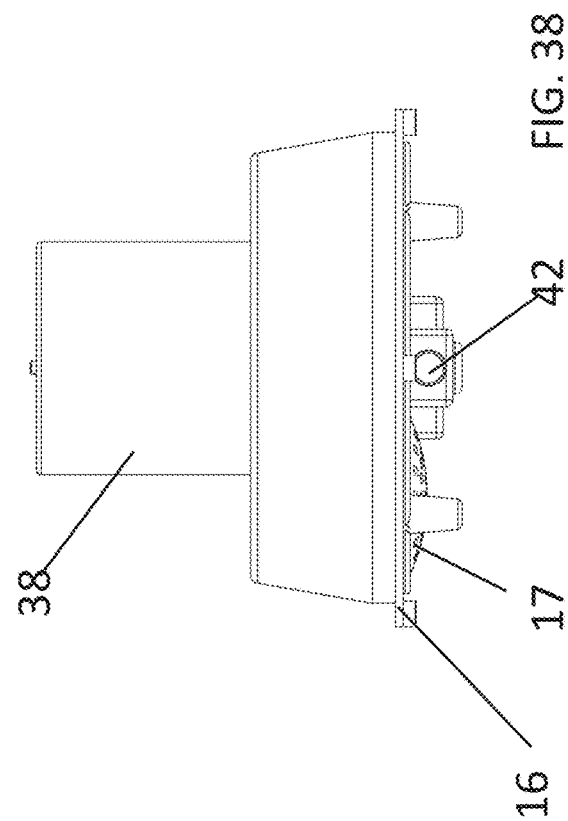
FIG. 38 is another side view of the cylinder-shaped projection module according to the fourth embodiment of the present application.
Figure 37:
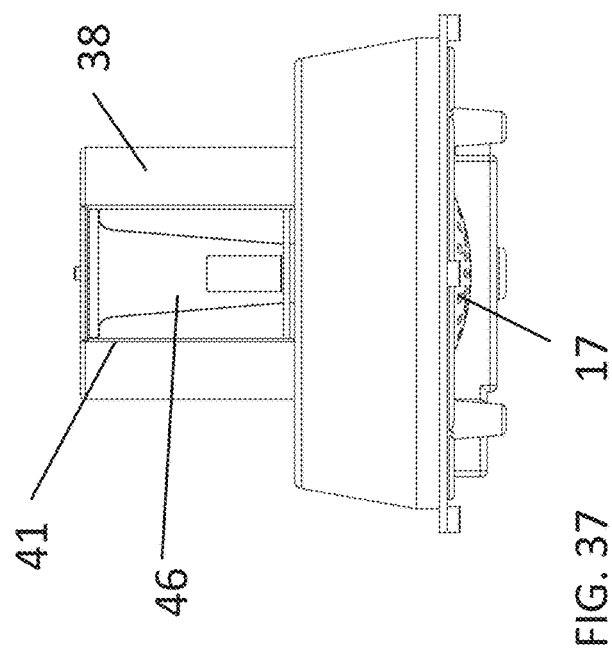
FIG. 37 is a side view of the cylinder-shaped projection module according to the fourth embodiment of the present application.

The projection section can be configured as a rotatable cylinder-shaped projection unit 38 (See FIG. 6, FIG. 31 and FIG. 33).

In this configuration, module 34 can be configured to hold a rotatable cylinder-shaped projection unit 38. It may include the following parts: an outer housing 5, a cylinder-shaped projection unit 38, an inner housing 6, module base 16, battery compartment 12 and speaker 11 (for the function of playback music or sound). FIG. 6 is a drawing of the module 34 which can be configured to hold a rotatable cylinder-shaped projection unit 38.

The cylinder-shaped projection unit 38 can be rotatable, so users can change the projection image by turning a switch 40 located at the bottom of the module 34.

Figure 32:
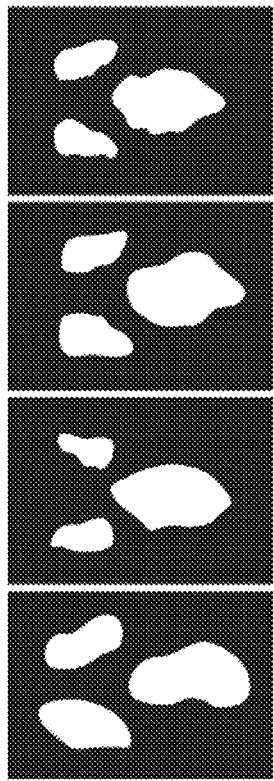
FIG. 32 shows the examples of different face image on the projection film.

FIG. 32 are examples of different projection films 39 with different transparent images, which can be placed into the cylinder-shaped projection unit 38 (as shown in FIG. 31).

The cylinder-shaped projection unit 38 may have an opening 41 at the front. An LED light may be fixed inside the cylinder-shaped projection unit 38. The LED may serve as a light source inside the cylinder-shaped projection unit 38. When the LED is turned on and it works as a light source to project the image printed on the projection film 39 onto the pumpkin shell from its interior.

To change the projection image under this configuration, users do not have to take the whole module 34 out. People can easily change the projection image by turning the switch 40 at the bottom of the module 34. Gear 35 and a spinning plate in the cylinder-shaped projection unit 38 may be connected with a shaft 37. Gear 36 and the switch 40 may be connected by another shaft 37'. When a user turns the switch 40 clockwise, gear 36 will turn clockwise and drive gear 35 to turn anti-clockwise. Since gear 35 and a spinning plate in the cylinder-shaped projection unit 38 are connected, so the spinning plate will also turn anti-clockwise. As a result, the projection film 39 fixed on the spinning plate will be rotated anti-clockwise. If another face or graphic printed on the projection film 39 is rotated to the location where the light source can shine through the projection film 39 and the opening 41, then it will project another face or graphic illusion onto the pumpkin shell from its interior.

As shown in FIGS. 7-10, a battery compartment 12 may be provided to hold three AA batteries which can serve as a power supply for the module 34. A speaker cavity 17 can be provided to hold a speaker 11. The device will be able to playback music or sound if the speaker 11 is installed.

As shown in FIG. 12 and FIG. 14, the module 34 can also be configured to use Li-Polymer rechargeable battery. If Li-Polymer rechargeable battery is used, there should be a micro USB port 21 provided for the purpose of charging the battery. Rechargeable battery can be recharged by connecting the module 34 to a USB charger or a USB port on a computer via a USB charging cable.

Both AA batteries in the battery compartment 12 and Li-Polymer rechargeable battery can provide power to light up the LED in the cylinder-shaped projection unit 38 to work as a light source in the projection unit. Once the light source is on, it will project the projected image 23 on the pumpkin shell from its interior.

If Bluetooth® technology is used, the speaker 11 can play the music or sound once the device is successfully connected to any mobile device via the Bluetooth® technology.

If integrated circuit is configured, the speaker 11 can playback pre-recorded music or sound effect stored in an IC chip.

Embodiment 4

As another embodiment of a rotatable cylinder-shaped projection unit 38 (See FIGS. 34-38) this option provides users an option to switch the projection image by pressing a button on the bottom of the module base 16.

In this configuration, module 34 can be configured to hold a rotatable cylinder-shaped projection unit 38. It may include the following parts: an outer housing 5, a cylinder-shaped projection unit 38, an inner housing 6, module base 16, button 42, shaft connector 43, shaft 44, joint 45, four-side film holder 46, spring 47, star gear 48, battery compartment 12 and speaker 11 (for the function of playback music or sound). FIG. 34 is a drawing of the module 34 which can be configured to hold an automatic rotatable cylinder-shaped projection unit 38.

The cylinder-shaped projection unit 38 can be rotatable, so users can change the projection image by pressing the button 42 located at the bottom of the module 34.

FIG. 32 are examples of different projection film 39 designs, which can be placed into the cylinder-shaped projection unit 38 (as shown in FIG. 31).

The cylinder-shaped projection unit 38 may have an opening 41 at the front. An LED light may be fixed inside the cylinder-shaped projection unit 38. The LED may serve as a light source inside the cylinder-shaped projection unit 38. When the LED is turned on and it works as a light source to project the image printed on the projection film fixed on the four-side film holder onto the pumpkin shell from its interior. It is possible that the image is not transparent, whereas the area around the image is transparent. It is also possible that the image is transparent, whereas the area around the image is not transparent. It is also possible that the image can be a cut-out hole or silhouette where light can shine through the hole or the silhouette to project the desire image on the pumpkin shell 22 from its interior.

To change the projection image under this configuration, users do not have to take the whole module 34 out. Users can easily change the projection image by pressing a button 42 at the bottom of the module 34, as shown in FIGS. 34, 35, 35a and 36. When the button 42 is pressed, a shaft connector 43, which may be connected with the button 42, is moved in a direction towards a biasing spring 47 to thereby compress the spring 47. The spring 47 may be mounted on a rod 45, which may be connected to one side of the shaft connector 43 opposite to the button 42. When the shaft connector 43 is moved, a pointy tooth 49 provided thereon can engage with a 4-tooth gear 48, which may be mounted on a lower end of a central shaft 44 provided on the four-sided film holder 46. When the button 42 is pressed, the 4-tooth gear 48 will rotate forty-five degrees anti-clockwise by the pointy tooth 49, and the shaft 44 will also rotate forty-five degrees anti-clockwise. Then, the four-sided film holder 46, which is connected to the shaft 44, will rotate forty-five degrees. As a result, an adjacent side of the four-sided film holder 46 will be facing the opening 41. The image on that adjacent side of the four-sided film holder 46 will then be the image to be projected from the projection unit. Since the spring 47 is mounted on the rod 45, which is connected with the shaft connector 43, the shaft connector 43 will return to its original position under the biasing force of the spring 47 when the button 42 is not being pressed. The shaft connector 43, when returned to its original position, is configured to hold the 4-tooth gear 48 in place until the button 42 is pressed again.

As shown in FIGS. 7-10, a battery compartment 12 may be provided to hold three AA batteries which can serve as a power supply for the module 34. A speaker cavity 17 may be provided to hold a speaker 11. The device will be able to playback music or sound if the speaker 11 is installed.

As shown in FIG. 12 and FIG. 14, the module 34 can also be configured to use Li-Polymer rechargeable battery. If Li-Polymer rechargeable battery is used, there should be a micro USB port 21 provided for the purpose of charging the battery. Rechargeable battery can be recharged by connecting the module 34 to a USB charger or a USB port on a computer via a USB charging cable.

Both AA batteries in the battery compartment 12 and Li-Polymer rechargeable battery can provide power to light up the LED in the cylinder-shaped projection unit 38 to work as a light source in the projection unit. Once the light source is on, it will project the projected image 23 on the pumpkin shell from its interior.

If Bluetooth® technology is adopted, the speaker 11 can play the music or sound once the device is successfully connected to any mobile device via the Bluetooth® technology.

If integrated circuit (IC) is used, the speaker 11 can playback pre-recorded music or sound effect stored in an IC chip.

Embodiment 5

Figure 28:
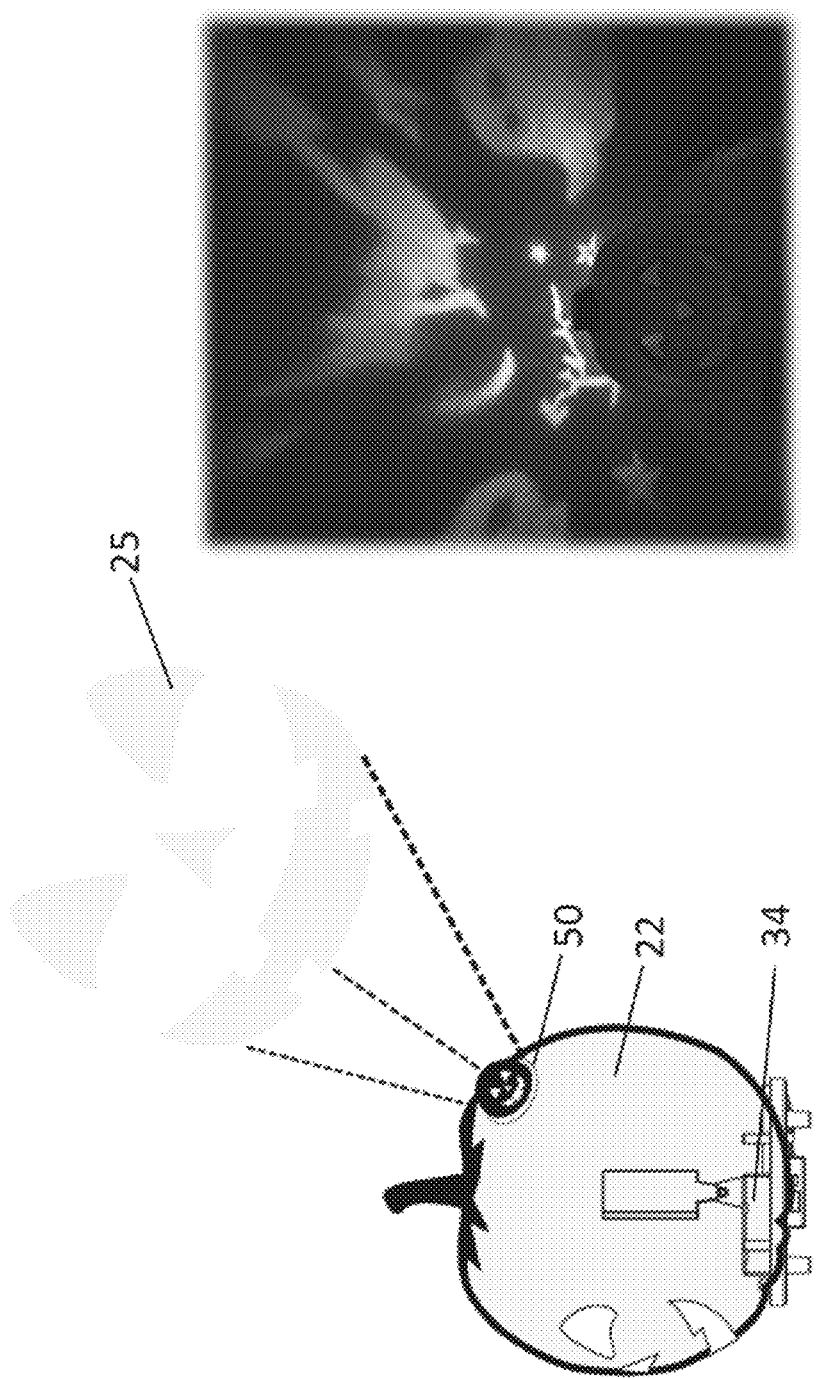
FIG. 28 is the drawing of the illuminated pumpkin with projection unit place on the surface of the pumpkin shell, illustrating the projected image can be projected on to the wall according to the fifth embodiment of the present application.

The projection section can also be configured as a separate projection unit 50 which can be mounted on the surface of the pumpkin shell 22 (See FIG. 28). The separate projection unit 50 may include a separate light source and a separate projection film with a separate image. The separate projection unit 50 may be dome-shaped or may have another shape.

In this embodiment, the projection unit 50 can generate an enlarged projection illusion 25 on a surface facing the separate project unit 50, such as a wall or a background. The light source can either be an LED connected to the module 34 or an electric light from outside. Particularly, a C7 electric light can be plugged into the outlet. Bluetooth® speaker can be added to the device, so users can play their favorite music, sound effects or pre-recorded message with this Bluetooth® pumpkin speaker from their mobile device via Bluetooth® technology, which can create a great add-on feature to a Halloween decoration.

Although it has been shown and described above that the decoration device with projection images is designed for Halloween holiday, it is understood that the decoration device with projection images can be designed for any other holidays, festivals and parties.

Figure 39:
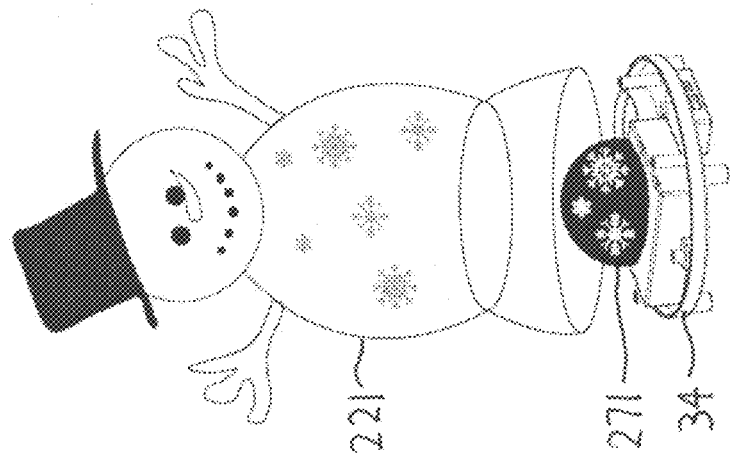
FIG. 39 is a decoration device with projection images for Christmas holiday according to an embodiment of the present application.

FIG. 39 is a decoration device with projection images for Christmas holiday according to an embodiment of the present application. It may include a module 34, a dome-shaped projection unit 271 with snowflake images mounted on the module 34, and a snowman-shaped shell 221.

Figure 40:
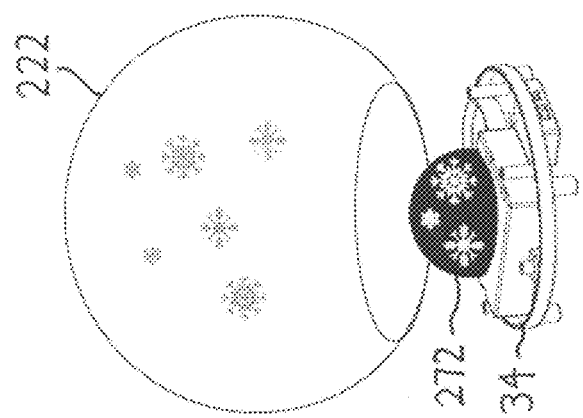
FIG. 40 is a decoration device with projection images for any holiday, festival and party according to an embodiment of the present application.

FIG. 40 is a decoration device with projection images for any holiday, festival or party according to an embodiment of the present application. It may include a module 34, a dome-shaped projection unit 272 with snowflakes or any images mounted on the module 34, and a circular shell 222.

Figure 41:
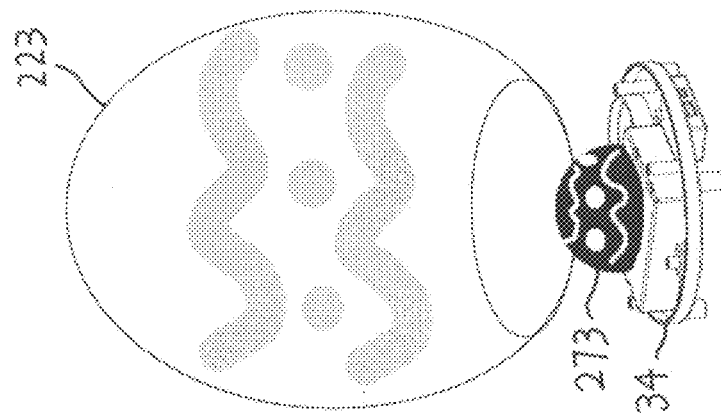
FIG. 41 is a decoration device with projection images for Easter holiday according to an embodiment of the present application.

FIG. 41 is a decoration device with projection images for Easter holiday according to an embodiment of the present application. It may include a module 34, a dome-shaped projection unit 273 with Easter egg design images mounted on the module 34, and an egg-shaped shell 223.

While the decoration device with projection images has been shown and described with particular references to a number of preferred embodiments thereof, it should be noted that various other changes or modifications may be made without departing from the scope of the appended claims.

What is claimed is:

1. A decoration device with projection images for holidays, festivals and parties, the device comprising:
   (a) a shell;
   (b) a module provided inside the shell, the module being provided with a power source;
   (c) a projection unit mounted on the module;
   (d) a projection film provided on the projection unit;
   (e) an LED light source disposed at one side of the projection film so that an image formed on the projection film can be projected on a surface of the shell by the light source when turned on by the power source;
   (f) a Bluetooth® speaker mounted inside the module, wherein Bluetooth® technology is used for communication between the speaker and a mobile device so that the speaker can play music and sound from the mobile device; and
   (g) a separate projection unit mounted on an outer surface of the shell for projecting a separate image on a wall, wherein the separate projection unit comprises a separate LED light source and a separate projection film formed with the separate image.

2. A decoration device with projection images, the device comprising:
   (a) a shell;
   (b) a module provided inside the shell, the module being provided with a power source;
   (c) a projection unit mounted on the module;
   (d) a projection film provided on the projection unit; and
   (e) a light source disposed at one side the projection film so that an image on the projection film can be projected on a surface of the shell by the light source when turned on by the power source;
   wherein the projection unit is cylindrical in shape, a 4-sided film holder is provided inside the cylindrical projection unit for holding thereon four projection films with four images respectively, and a rectangular opening is formed on the cylindrical projection unit to allow projection of the image on one of the four projection films.

3. The device as claimed in claim 2, wherein the projection unit is dome-shaped.

4. The device as claimed in claim 2, wherein the projection film is cylindrical in shape.

5. The device as claimed in claim 4, wherein the cylindrical projection film is supported on a first shaft coupled with a first gear which is meshed with a second gear, and the second gear is coupled with a second shaft rotatable by a switch formed at one end thereof, whereby the cylindrical projection film is rotatable by turning the switch.

6. The device as claimed in claim 2, wherein the image on the projection film is selected from the group consisting of transparent image, non-transparent image, cut-out hole and silhouette.

7. The device as claimed in claim 2, wherein the projection unit is hingedly connected with the module by a hinge mechanism so that projection angle can be adjusted.

8. The device as claimed in claim 7, wherein the hinge mechanism comprises two hinge rods formed on the projection unit and frictionally engaged within two c-shaped openings formed on two hinge rod-holding stands provided on the module respectively.

9. The device as claimed in claim 2, further comprising a speaker mounted inside the module.

10. The device as claimed in claim 9, wherein the speaker is a Bluetooth® speaker and Bluetooth® technology is used for communication between the speaker and a mobile device so that the speaker can play music and sound from the mobile device.

11. The device as claimed in claim 9, further comprising an integrated circuit chip connected with the speaker to playback pre-recorded music and sound stored in the chip.

12. The device as claimed in claim 2, further comprising a battery compartment provided in the module for holding therein a battery for supplying electric power.

13. The device as claimed in claim 2, further comprising a micro USB port provided on the module for connection with a charger for charging a rechargeable battery provided in the module.

14. The device as claimed in claim 2, wherein the light source is an LED light source.

15. The device as claimed in claim 2, further comprising a separate projection unit mounted on an outer surface of the shell for projecting a separate image on a surface facing the separate projection unit.

16. The device as claimed in claim 15, wherein the separate projection unit comprises a separate light source and a separate projection film formed with the separate image.

17. The device as claimed in claim 15, wherein the separate projection unit is dome-shaped.

18. The device as claimed in claim 2, wherein the four-sided film holder comprises a central shaft with a 4-tooth gear mounted on a lower end thereof, and a shaft connector provided with a pointy tooth engageable with the 4-tooth gear so that when a button provided on the shaft connector is pressed in a direction towards a biasing spring mounted on a rod connected to one side of the shaft connector opposite to the button, the pointy tooth engages with the 4-tooth gear and rotates the 4-tooth gear as well as the four-sided film holder forty-five degrees, and when the button is released the shaft connector returns to its original position under the biasing force of the spring.

* * * * *